United States Patent [19]

Bryndal

[11] B 4,014,712

[45] Mar. 29, 1977

[54] CATHODE-DEPOLARIZER MIX CONTAINING A POLYACRYLAMIDE BINDER

[75] Inventor: Richard J. Bryndal, Russell Township, Ohio

[73] Assignee: Union Carbide Corporation, New York, N.Y.

[22] Filed: Sept. 27, 1974

[21] Appl. No.: 509,819

[44] Published under the second Trial Voluntary Protest Program on April 13, 1976 as document No. B 509,819.

[52] U.S. Cl. .................................. 429/57; 429/199; 429/201; 252/182.1

[51] Int. Cl.² .................. H01M 6/00; H01M 10/00

[58] Field of Search .......... 136/20, 30, 100 R, 123, 136/124, 137, 138, 139, 107, 111, 131

[56] References Cited

UNITED STATES PATENTS

| | | | |
|---|---|---|---|
| 2,491,640 | 12/1949 | Blake et al. | 136/136 |
| 3,009,980 | 11/1961 | Corren et al. | 136/24 |
| 3,060,254 | 10/1962 | Urry | 136/138 |
| 3,113,050 | 12/1963 | Kordesch et al. | 136/123 |
| 3,600,231 | 8/1971 | Dawson | 136/138 |
| 3,655,449 | 4/1972 | Yamamoto et al. | 136/107 |
| 3,784,413 | 1/1974 | Watanabe et al. | 136/131 |

*Primary Examiner*—Donald L. Walton
*Attorney, Agent, or Firm*—Cornelius F. O'Brien

[57] ABSTRACT

Cathode-depolarizer mix cakes, bobbins or the like comprising manganese dioxide, conductive carbon, an aqueous solution of an ionic conductive material and a minor amount of a polyacrylamide binder for improving the strength and cohesiveness of the mix body.

11 Claims, No Drawings

CATHODE-DEPOLARIZER MIX CONTAINING A POLYACRYLAMIDE BINDER

FIELD OF THE INVENTION

This invention relates to galvanic cells and in particular to an improved cathode-depolarizer mix therefor.

BACKGROUND OF THE INVENTION

The principle of the so-called dry cell is well known, and the construction of commerical dry cells is somewhat fairly well standarized as evidenced by the disclosure in the textbook titled "Batteries" edited by Karl V. Kordesch — Marcel Dekker, Inc. New York publishers — 1974 and the textbook titled "Primary Batteries" by George W. Vinal — John Wiley and Sons, Inc., New York publishers — 1951.

The term "dry cell" implies that the electrolyte of the cell is immobilized, much of it being contained or absorbed by a layer of material interposed between the anode and cathode of the cell. This layer is generally referred to as the separator and is a physical member or structure which retains the electrolyte solution and provides a means for maintaining the anode in working engagement with the cathode while at the same time maintaining physical separation between the anode and the cathode, said cathode, usually in a mix form.

Examples of commercial dry cells on the market today include such cells as the Leclanche cell, the zinc chloride cell and the magnesium cell. These cells basically comprise an anode, a cathode-depolarizer mix and an electrolyte between the cathode-depolarizer mix and the anode. A conventional cylindrical dry cell is made up of a container of an anodic metal high in the electromotive series, such as zinc, magnesium or alloys thereof, which serves as the anode, a depolarizer mix generally containing a reducible chemical compound, particulate conductive material and an aqueous solution of an ionic conductive material (electrolyte) chosen with regard to the nature of the cathodic and anodic materials, and a separator, also containing the electrolyte, positioned between the anode and the cathode-depolarizer mix.

It is well known in the art to fabricate dry cell separators from various gelatinous paste-type materials formed from starch, flour, or methyl cellulose, which may each be used either unsupported or supported by paper or similar backing or substrate material.

The cathode-depolarizer mix is generally in the form of a core or bobbin which is molded under pressure to an exact diameter and height to accommodate a specific cell size. The diameter of the bobbin is molded less than that of the interior of the anode container by an amount sufficient to provide a space therebetween to accommodate the electolyte, said electrolyte usually in the form of a paste containing an ionic conductive material chosen with respect to the nature of the cathodic and anodic materials of the cell and a stiffening agent or gelatinous medium such as starch with or without flour. The cathode-depolarizer mix may be molded around a conductive rod, such as a carbon rod, or the conductive rod may be driven through the mass of the mix after it has been formed. The conductive rod, sometimes referred to as the positive electrode, is not strictly an electrode but rather a collector and conductor of electric current from the cathode to the positive terminal external of the cell.

Upon being ejected from the mold, the bobbins are assembled into the anode containers. Care is required in the handling of bobbins since any mechanical injury, even to a slight degree, can result in cracking and chipping of the mix forming the bobbins. In fact, the accidental striking of the bobbins against foreign objects or even severe jarring of the bobbins during their assembly has resulted in chipping and breaking of the bobbins to an extent that such chips and broken bobbins account for a sizable amount of the depolarizer mix that is classified as waste or scrap. In addition to the economic loss due to excessive waste of the depolarizer mix because of chipping and breaking of bobbins during their assembly, the cells assembled with chipped or broken bobbins are deprived of reducible material thereby possibly shortening the useful life of such cells.

It is not only the bobbin mix that must be handled with care to prevent the mix from cracking and chipping, but any depolarizer mix that is formed into a discrete body, no matter how small, and which is subject to handling before and/or during assembly, will require gentle handling if cracking, chipping and/or breaking of the mix is to be minimized. Thus the depolarizer mix that is formed into small discrete slugs which are fed into a separator-lined anode container and then tamped before, after, or during the insertion of the carbon rod to form the bobbin in place, also requires special handling since it too is subject to cracking and/or breaking when subject to mechanical injury.

Another form of depolarizer mix body requiring special handling is called a mix cake which is used in what are commonly called flat cells, such as the "Mini'Max" type cells. The mix cake is usually a square, rectangular, or circular shaped molded body comprising the same components of the depolarizer mix used in the cylindrical type cells. The problems encountered in handling the mix cakes are the same as those recited above for the molded bobbins.

An object of the present invention is to provide an improved cathode-depolarizer mix for galvanic cells.

Another object of the present invention is to provide a discrete body of a cathode-depolarizer mix that will substantially resist chipping and/or breaking when mechanically injured.

Another object of the present invention is to provide an improved binder for various cathode-depolarizer mixes which are formed into bobbins, mix cakes or similar bodies.

Another object of the present invention is to provide an improved cathode-depolarizer mix which contains a minor amount of polyacrylamide binder.

Another object of the present invention is to provide a process for making an improved cathode-depolarizer mix which contains a minor amount of a polyacrylamide binder.

SUMMARY OF THE INVENTION

The invention basically relates to a galvanic cell having an anode; a cathode-depolarizer mix containing manganese dioxide, a carbonaceous conductive material and an electrolyte; and a separator interposed between said anode and said cathode-depolarizer mix and also containing the electrolyte; the improvement comprising a polyacrylamide binder in said cathode-depolarizer mix in an amount ranging between about 0.1% to about 1.5% based on the weight of the cathode-depolarizer mix. Preferably the polyacrylamide should be added in a particulate form, such as powder, in a range between about 0.1% and about 0.7% based on the weight of the cathode-depolarizer mix and have a molecular weight between about 0.5 million and about 8 million.

More preferably, the polyacrylamide should have a molecular weight between about 3 million and about 6 million.

An illustration of a solid polyacrylamide suitable for use in this invention has the general formula

$$(CH_2CHCONH_2)_x$$

wherein $x$ can vary between about 7,000 and about 57,000; preferably between about 21,000 and 43,000. This polyacrylamide is characterized as being a white solid high polymer. A further definition of polyacrylamides can be found in the textbook titled "Vinyl And Related Polymers" by Calvin L. Schildknecht, a John Wiley and Sons publication dated 1952, or in The Encyclopedia of Polymer Science and Technology-Vol. 1, pp 177 to 195 — John Wiley and Sons, Inc. Publishers-1964 Edition.

Commercially available polyacrylamide can be obtained from the American Cyanamide Company, Wayne, New Jersey as a non-ionic homopolymer under the trade name "Cyanamer" P 250 Polyacrylamide.

It has been found that when polyacrylamide in the particulate form is blended with a dry cathode-depolarizer mix followed thereafter by the addition and then blending of an electrolyte, such as an aqueous solution of at least one halogen-containing compound selected from the group consisting of zinc chloride, zinc bromide, zinc perchlorate, ammonium chloride, magnesium bromide, magnesium chloride and magnesium perchlorate, a mix will be produced which when molded or otherwise formed into a discrete body will be better able to withstand mechanical injury without chipping, cracking and/or breaking than would a mix body identical in all aspects except lacking the polyacrylamide.

It has also been found that when polyacrylamide is included in a cathode-depolarizer mix in the range specified above, and then the overall mix is formed into a discrete body such as a mix cake of the type used in flat cells, the polyacrylamide will act as a resilient binder which imparts improved strength and cohesiveness to the mix body. The resiliency of the polyacrylamide binder in the mix is such that the polyacrylamide behaves like "elastic filaments" throughout the mix so that when the mix body is fractured, it does not separate into a substantial number of scattered pieces but instead the pieces of the mix are held together by the polyacrylamide. It has been observed that when a piece of a cathode-depolarizer mix body prepared in accordance with this invention is separated by as much as ½ inch from the main body, the piece, upon release, will return to the mix body. The resiliency exhibited by the polyacrylamide dispersed in a cathode-depolarizer mix body is a totally unexpected phenomenon that imparts to the cathode-depolarizer mix body the necessary strength and cohesiveness needed to resist chipping, breaking and/or cracking during the assembly of the mix body into its cell compartments or containers.

The inclusion of the polyacrylamide in the mix in an amount less than about 0.1% based on the weight of the mix would be insufficient to effectively reduce the cracking, breaking and/or chipping of the mix body prior to and during its assembly into cells. To state it another way, if the amount of the polyacrylamide included in a mix is below 0.1%, then the polyacrylamide would not provide the necessary resiliency to the mix body needed if the mix body is to effectively withstand chipping, breaking and/or cracking when subject to low level mechanical injury. On the other hand, an addition of polyacrylamide to the mix in an amount more than about 1.5% based on the weight of the mix would render the mix too sticky and difficult for machines to handle during the compression process.

The invention also relates to a process for preparing a discrete body of a cathode-depolarizer mix which comprises:

a. blending a dry mix comprising particulate manganese dioxide, a particulate carbonaceous conductive material, particulate polyacrylamide with or without a particulate, dry electrolyte salt comprising at least one halogen-containing compound selected from the group consisting of zinc chloride, zinc bromide, zinc perchlorate, ammonium chloride, magnesium chloride, magnesium bromide and magnesium perchlorate;

b. blending the blend of step (a) with a liquid such as water or an aqueous solution of at least one halogen-containing compound selected from the group consisting of zinc chloride, zinc bromide, zinc perchlorate, ammonium chloride, magnesium chloride, magnesium bromide and magnesium perchlorate until a homogeneous blend is obtained; and c. molding the homogeneous blend into a discrete cathode-depolarizer mix body.

It is essential that the polyacrylamide be added to the dry cathode-depolarizer mix and then blended therein before the water or aqueous solution is added because if the polyacrylamide is added as a solution, it will coat the other ingredients of the mix and thereby interfere with cathode electronic conductivity and, consequently, also interfere with the electrochemical reactions within a cell employing the cathode.

The particulate polyacrylamide, when uniformly distributed throughout the mix, will absorb some of the electrolyte and in addition will function as a structural binder which increases the cohesive strength of the mix. The electrochemical performance of cells using cathode-depolarizer mix bodies fabricated with a polyacrylamide inclusion in the above cited ranges has been found to be the same as, or superior to, the electrochemical performance of cells otherwise identical but without the polyacrylamide. It is believed that the polyacrylamide is not cross linked or chemically altered as employed in the cathode-depolarizer mix body of the invention.

The time and extent required for blending the dry ingredients and then blending such ingredients with water or the aqueous solution referred to above can be determined by any artisan familiar with the battery art. Likewise, the ratio of the ingredients for the cathode-depolarizer mix, including the polyacrylamide, can vary depending upon the intended cell use and the specific requirement of the electrochemical reactions of various cells.

A carbonaceous conductive material admirably suited for use in this invention includes particulate acetylene black, particulate graphite or mixtures of the two. As used herein, the term "particulate" shall mean a material in the form of distinct particles such as powders, flakes, small solid pieces, or particles that result when a solid is crushed, ground or otherwise pulverized.

An electrolyte suited for use in this invention would comprise at least one halogen-containing compound selected from the group consisting of zinc chloride, zinc bromide, zinc perchlorate, ammonium chloride, magnesium chloride, magnesium bromide and magnesium perchlorate.

This invention is of particular benefit for zinc chloride cells since the mix used in such cells does not possess the cohesiveness of the Leclanche mixes and, therefore, when such mix is formed into bobbins or cakes, the mix body tends to be very crumbly, wet and sensitive to uneven stresses. However, it has been observed that with the inclusion of polyacrylamide in the mix as a binder medium, the cohesiveness and strength of the mix body improved to a degree that cracking, chipping and/or breaking of the mix body were greatly reduced during normal assembly handling.

Prior art resilient binders represented by rubber latex and the like have been generally non-absorptive of electrolyte and have therefore acted as barriers to ionic conductivity and diffusion. By contrast, the particulate polyacrylamide will imbibe or absorb the aqueous electrolyte to yield swollen or electrolyte containing particles or discrete masses which do not interfere with ionic conductivity or diffusion. Another benefit of particulate polyacrylamide is that the electrolyte swollen mass aids in maintaining electrolyte adjacent the cathode depolarizer. This is an important feature with respect to all cells, and specifically with respect to zinc chloride cells since such cells require more of an aqueous solution than the Leclanche cells.

EXAMPLE 1

Forty 9-volt flat cell batteries, each measuring 1 inch wide by 2 inches high by ¾ inch in depth, were produced using a zinc anode, a cathode-depolarizer mix cake (prepared by a pressure molding technique as disclosed on page 9), composed of 58.5% manganese dioxide ore, 7.3% acetylene black, 14.7% ammonium chloride, 0.5% polyacrylamide powder (obtained commercially from the American Cyanamid Company as "Cyanamer" P-250 Polyacrylamide) and the remainder an aqueous solution of zinc chloride, and a separator made of methyl cellulose coated paper disposed between the anode and cathode. The cathode-depolarizer mix cakes were handled and assembled in the normal fashion and exhibited substantially less breakage, cracking and chipping than normally encountered in the handling of identical mix cakes but without the polyacrylamide powder. The flat cell batteries containing the polyacrylamide powder and similar flat cell batteries but without the polyacrylamide powder, were discharged across a 500-ohm resistive load for 4 hours a day until the close circuit voltage recorded decreased to 5.4 volts and then to 4.2 volts. The results, shown in Table 1, clearly illustrate that the polyacrylamide powder inclusion, instead of having a detrimental effect on the power output service, may actually increase the power output service of the cells.

Identical fresh mix cakes were tested for flexural strength. The test consisted of supporting each mix cake at its ends and then recording the break-pressure required to fracture the mix cake when a blade was applied against the "edge" side of the mix cake. The results are also shown in Table I and clearly illustrate the improved strength and cohesiveness of mix cakes containing the polyacrylamide powder according to this invention.

TABLE I

| Mix Cake | Breaking Pressure (lbs.) | 5.4 Volts (Time-hours) | 4.2 Volts (Time-hours) |
|---|---|---|---|
| without polyacrylamide | 3.1 | 15.9 | 23.1 |
| with 0.5% polyacrylamide | 3.9 | 18.7 | 26.8 |

To further show the improved strength and cohesiveness of the mix cakes obtained from the inclusion of polyacrylamide powder, an inspection of the mix cakes revealed that pieces of the mix cakes could be separated from ¼ inch to ½ inch from the mix cake and then when released, the pieces would return to close contact with the body of the mix. This characteristic is referred to above as the "elastic filament" effect obtained through the inclusion of polyacrylamide in the mix.

EXAMPLE 2

Several hundred 1.5-volt D-size zinc chloride cells were produced each using a zinc anode can, a cathode-depolarizer mix bobbin (prepared by a pressure molding technique as disclosed on page 9), comprising 9 percent acetylene black, 50.4 percent manganese dioxide ore, 0.15 percent polyacrylamide ("Cyanamer" P-250 Polyacrylamide) and the remainder an aqueous solution of zinc chloride, and a separator, disposed between the anode and the bobbin, comprising starch in an aqueous solution of zinc chloride. The bobbins were handled in the normal way during assembly and exhibited substantially less breakage, cracking and chipping than normally encountered in the handling of identical mix bobbins but without the polyacrylamide powder. Each cell, upon being tested, was found to have a power output which was the same as the power output of identical cells but without the polyacrylamide.

The disclosure referred to in the above-cited textbooks is incorporated herein by reference.

While the present invention has been described with reference to many particular details thereof, it is not intended that these details shall be construed as limiting the scope of this invention.

What is claimed is:

1. A galvanic cell having an anode; a cathode-depolarizer mix containing manganese dioxide, a carbonaceous conductive material and an electrolyte; and a separator interposed between said anode and said cathode-depolarizer mix and also containing a portion of the electrolyte; the improvement comprising discrete particles of polyacrylamide in said cathod-depolarizer mix in an amount ranging between about 0.1% to about 1.5% based on the weight of the cathode-depolarizer mix.

2. The galvanic cell of claim 1 wherein said electrolyte comprising at least one halogen-containing compound selected from the group consisting of zinc chloride, zinc bromide, zinc perchlorate, ammonium chloride, magnesium chloride, magnesium bromide and magnesium perchlorate.

3. The galvanic cell of claim 1 wherein said polyacrylamide is present in an amount between about 0.1 % and about 0.7 % based on the weight of the cathode-depolarizer mix.

4. The galvanic cell of claim 1 wherein said polyacrylamide has a molecular weight of between about 0.5 million and about 8 million.

5. The galvanic cell of claim 1 wherein said cathode-depolarizer mix is in the form of a discrete mix body.

6. The galvanic cell of claim 2 wherein the halogen-containing compounds are ammonium chloride and zinc chloride.

7. The galvanic cell of claim 2 wherein the halogen-containing compound is zinc chloride.

8. The galvanic cell of claim 2 wherein the halogen-containing compound is selected from the group consisting of magnesium perchlorate, magnesium bromide and mixtures thereof.

9. The galvanic cell of claim 1 wherein the polyacrylamide is present in an amount between about 0.1% and about 0.7% based on the weight of the mix and wherein said polyacrylamide has a molecular weight between about 3 million and about 6 million.

10. A process for making a discrete cathode-depolarizer mix body for galvanic cells which comprises:
 a. blending a dry mix comprising particulate manganese dioxide, a particulate carbonaceous conductive material, particulate polyacrylamide and a particulate, dry electrolyte salt comprising at least one halogen-containing compound selected from the group consisting of zinc chloride, zinc bromide, zinc perchlorate, ammonium chloride, magnesium chloride, magnesium bromide and magnesium perchlorate.
 b. blending the blend of step a) with a liquid selective from the group consisting of water and an aqueous solution of at least one halogen-containing compound selected from the group consisting of zinc chloride, zinc bromide, zinc perchlorate, ammonium chloride, magnesium chloride, magnesium bromide and magnesium perchlorate, until a homogeneous blend is obtained; and
 c. molding the homogeneous blend into a discrete cathode-depolarizer mix body.

11. A process for making a discrete cathode-depolarizer mix body for galvanic cells which comprises:
 a. blending a dry mix comprising particulate manganese dioxide, a particulate carbonaceous conductive material and particulate polyacrylamide;
 b. blending the blend of step a) with an aqueous solution of at least one halogen-containing compound selected from the group consisting of zinc chloride, zinc bromide, zinc perchlorate, ammonium chloride, magnesium chloride, magnesium bromide and magnesium perchlorate, until a homogeneous blend is obtained; and
 c. molding the homogeneous blend into a discrete cathode-depolarizer mix body.

* * * * *